(12) United States Patent
Buard

(10) Patent No.: US 6,429,374 B2
(45) Date of Patent: Aug. 6, 2002

(54) END CAP FOR TRUNKING FOR ROUTING ELECTRICAL CONDUCTORS OR CABLES

(75) Inventor: Yvon Buard, Voutre (FR)

(73) Assignees: Legrand; Legrand SNC, both of Limoges (FR)

( * ) Notice: Subject to any disclaimer, the term of this patent is extended or adjusted under 35 U.S.C. 154(b) by 0 days.

(21) Appl. No.: 09/790,510

(22) Filed: Feb. 23, 2001

(30) Foreign Application Priority Data

Feb. 24, 2000 (FR) ............................................. 00 02330

(51) Int. Cl.[7] ................................................. H01R 4/22
(52) U.S. Cl. ............................ 174/93; 174/49; 16/95 R
(58) Field of Search ............................. 174/93, 49, 48, 174/54, 50; 16/87 R, 87.4 R, 96 R, 95 R, 94 R

(56) References Cited

U.S. PATENT DOCUMENTS

| 1,014,020 A | * | 1/1912 | Miller ......................... 16/95 R |
| 5,206,972 A | * | 5/1993 | Nudelmont et al. ........ 16/95 R |
| 6,178,094 B1 | * | 1/2001 | Hakozaki ..................... 16/95 R |

FOREIGN PATENT DOCUMENTS

EP        0 849 851        6/1998

* cited by examiner

Primary Examiner—Chau N. Nguyen
(74) Attorney, Agent, or Firm—Young & Thompson

(57) ABSTRACT

An end cap for closing an end of trunking includes a closure part for closing an interior space of the trunking and a fixing part for fixing it to a back of a base section of the trunking. The fixing part includes a chimney for inserting a nail. The chimney is substantially perpendicular to the back of the base section and has a height substantially equal to the depth of the base section.

20 Claims, 4 Drawing Sheets

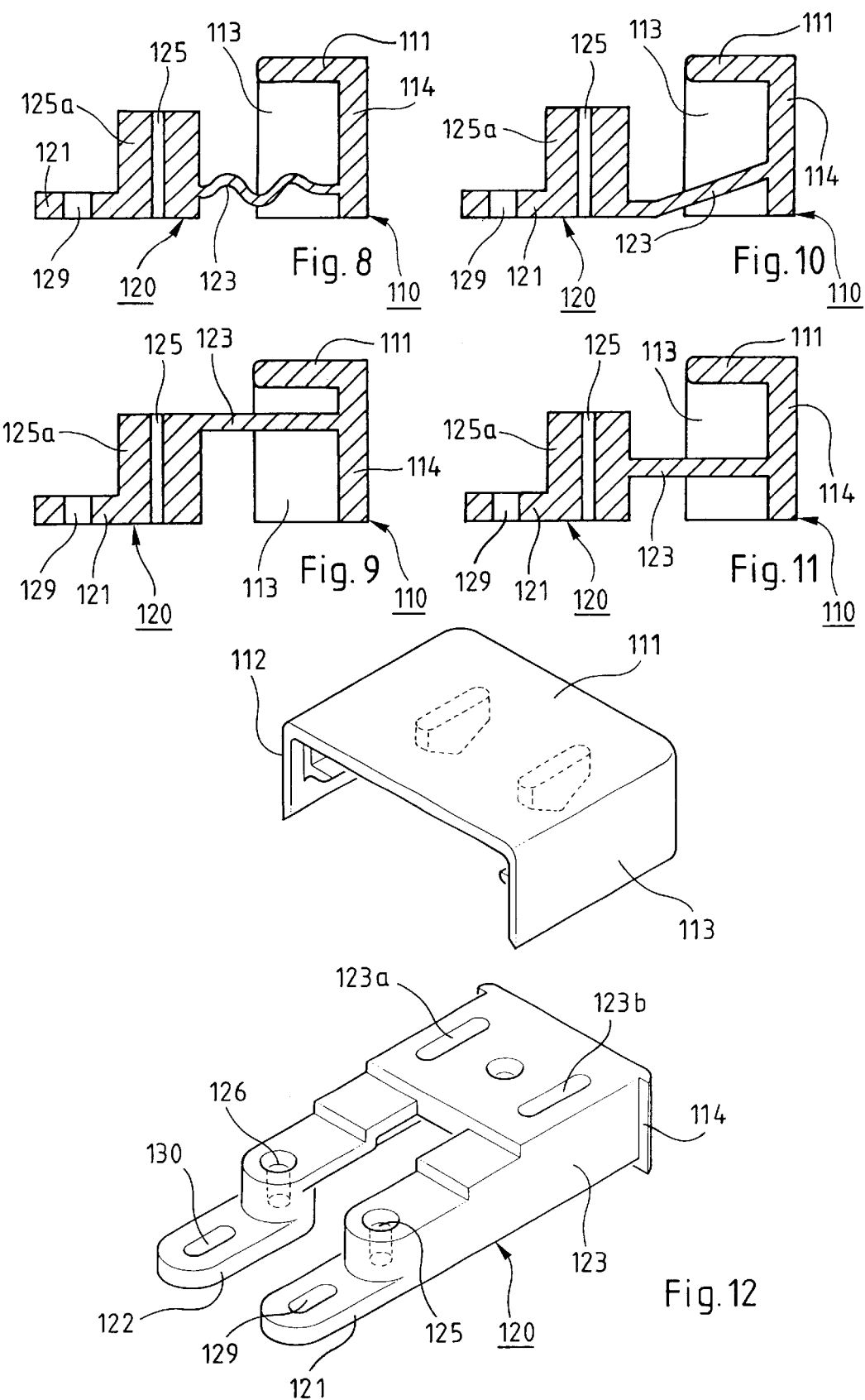

END CAP FOR TRUNKING FOR ROUTING ELECTRICAL CONDUCTORS OR CABLES

BACKGROUND OF THE INVENTION

1. Field of the Invention

The present invention relates to an end cap for closing one end of trunking for routing electrical conductors or cables, the end cap comprising a closure part for closing the interior space of the trunking and a fixing part for fixing it to the back of the base section of the trunking.

The invention finds a particularly advantageous application to closing the end of a kind of trunking with small dimensions also known as a molding.

This kind of end cap is intended to protect the end of the trunking against impact and most importantly to protect persons from the electrical current flowing in the conductors inside the trunking.

The two functions are combined when it is required to prevent the insertion of foreign bodies such as wires, pins or screwdrivers into the base section of the trunking.

The end cap also has an esthetic function, in particular to provide a harmonious transition between the cover section closing the trunking and the closure part of the end cap and between the outside surface of the trunking and that of the support to which it is fixed.

2. Description of the Prior Art

The above type of end cap of is disclosed in French patent 2 738 960, in particular. The fixing part is applied to the back of the base section of the trunking and has preferably oblong openings for nails which pass through the base section.

In the case of the kind of trunking with small dimensions also known as a molding, it is difficult to drive in the nails.

It requires the use of a hammer with access to the back of the base section of the trunking, which is not always easy, and it often happens that a hammer blow damages the lateral flanges of the base section of the trunking or molding.

SUMMARY OF THE INVENTION

To remove the above drawback, the present invention proposes an end cap for closing an end of trunking, the end cap including a closure part for closing an interior space of the trunking and a fixing part for fixing it to a back of a base section of the trunking, wherein the fixing part includes a chimney for inserting a nail, which chimney is substantially perpendicular to the back of the base section and has a height substantially equal to the depth of the base section.

The top of the chimney of the fixing part of the end cap according to the invention is therefore flush with the tops of the lateral flanges of the base section of the trunking, which limits the stroke of the hammer and protects the lateral flanges of the base section.

Other, non-limiting and advantageous features of the end cap according to the invention are as follows:

- the fixing part includes a lug adapted to be applied to the back of the base section of the trunking and from which a chimney projects;
- the fixing part includes two substantially parallel lugs adapted to be applied to the back of the base section of the trunking and from each of which a chimney projects; this arrangement is particularly advantageous in the case of trunking or a molding with two longitudinal compartments, each fixing lug being fixed into the back of one of the compartments of the trunking;
- the lugs can have on facing inside longitudinal edges facing recesses of complementary shape forming a housing for fastening the fixing part to the base section of the trunking by means of a fixing member such as a plastics material wall plug;
- the recesses are preferably part-circular; this arrangement of the inside longitudinal edges can be used only with a molding with a single compartment, in which the two lugs of the fixing part of the end cup in accordance with the invention would be positioned;
- each lug is connected to the closure part by a connecting part;
- the chimney is at the junction of the lug and the connecting part;
- in a first embodiment, the connecting part is an extension of the lug itself;
- in a second embodiment, the connecting part has two branches extending from one end of each lug on each side of its longitudinal edges and the branches form a kind of fork connecting the lug to the closure part;
- in a third embodiment, the connecting part is a tongue extending generally obliquely between each lug and the closure part;
- in a fourth embodiment, the connecting part is a tongue which extends in the heightwise direction relative to each lug between an outside wall of the chimney and the closure part; in this case the connecting part can extend in a plane parallel to that of each lug and substantially at the height of an upper end of the chimney;
- in a fifth embodiment, the connecting part is a massive part which has a bottom surface flush with a bottom surface of each lug and a top surface substantially flush with a top end of each chimney;
- the connecting part is preferably an elastic part allowing slight movement of the closure part relative to the fixing part when fitting the end cap to the base section of the trunking;
- the elastic part connecting each lug to the closure part has a corrugated shape forming a spring;
- the closure part can have a closure wall and a cover portion adapted to cover an end of a closure cover section of the trunking;
- either the closure wall and the cover portion of the closure part can be molded in one piece from one or more plastics materials, or the closure wall and the cover portion of the closure part are two separate components fastened together and the closure wall is fastened to the fixing part of the end cap;
- the fixing part and the closure part of the end cap can be molded in one piece from one or more plastics materials;
- each lug of the fixing part has at its free end an orifice through which a fixing screw can pass into the base section of the trunking.

The following description, which is given with reference to the accompanying drawings, which are provided by way of non-limiting example, explains in what the invention consists and how it can be put into effect.

BRIEF DESCRIPTION OF THE DRAWINGS

FIGS. 8 to 11 are diagrammatic views in a vertical plane of four different embodiments of the end cap according to the invention.

FIG. 12 is a diagrammatic exploded perspective view of a further embodiment of the end cap according to the invention.

DETAILED DESCRIPTION OF THE PREFERRED EMBODIMENTS

Note that identical or similar parts of the various embodiments of the invention are as far as possible designated by the same reference symbols in all the figures and are not described again each time.

Figure 1:
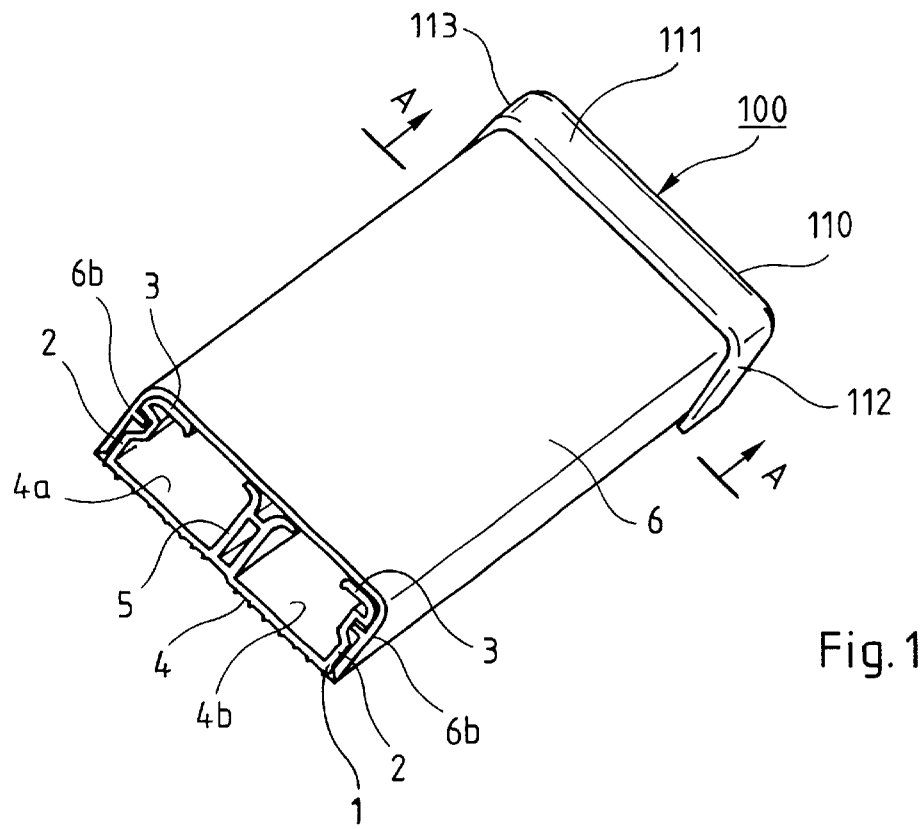
FIG. 1 is a side perspective view of a portion of trunking closed at one end by an end cap according to the invention.

FIG. 1 shows trunking 1 with small dimensions, also referred to as a molding, designed for routing electrical cables or conductors.

The molding 1 includes a base section having a back 4 flanked by two longitudinal lateral flanges 2, this example of the base section have a generally U-shaped cross section. This is known in the art. flanges 2 of the base section of the trunking have rims 3 facing toward each other in a plane substantially transverse to the lateral flanges 2.

The base section of the trunking is divided into two longitudinal compartments by a longitudinal central wall 5 having divergent rims at its free edge, each rim being directed toward the rim 3 of one longitudinal lateral flange 2 of the base section of the trunking.

Thus the back 4 of the base section of the trunking 1 is divided into two parts 4a, 4b; each compartment is generally U-shaped in cross section.

The trunking 1 is closed by a closure cover section 6 which has upstanding edges that cover the outside surfaces of the longitudinal lateral flanges 2 of the base section of the trunking.

Of course, in a different embodiment, not shown, the closure cover section of the trunking 1 could have straight edges engaged in longitudinal grooves provided on each of the rims of the longitudinal lateral flanges of the trunking.

One end of the trunking 1 shown in FIG. 1 is closed by an end cap 100.

The end cap is designed to protect the end of the trunking against impact and most importantly to prevent access from that end to the electrical cables or conductors inside the trunking or the insertion into the trunking of foreign bodies such as wires, pins, screwdrivers, etc.

The end cap 100 also improves the esthetics of the trunking by providing a harmonious transition between the outside surface of the cover section covering the base section of the trunking and the support to which the trunking is fixed.

That support can be a vertical inside or outside wall.

A first preferred embodiment of the end cap 100 will now be described with reference to FIGS. 2 to 5.

The end cap 100 shown in those figures has a closure part 110 and a fixing part 120 for fixing it to the back of the base section of the trunking.

The closure part 110 includes a wall 114 for closing the interior space of the trunking and a cover portion 111 designed to cover a section of the closure cover section 6 of the trunking (see FIG. 1 in particular).

To this end, the cover portion 111 of the closure part 110 of the end cap 100 includes upstanding rims 112, 113 covering the upstanding rims 6a, 6b of the closure cover section 6 of the trunking 1.

The cover portion 111, 112, 113 and the closure wall 114 of the closure part 110 of the end cap are in one piece.

The end cap 100 further includes a fixing part 120 for fixing it to the back 4 of the base section of the trunking.

The fixing part 120 and the closure part 110 of the end cap are molded in one piece from one or more plastics materials.

The fixing part 120 includes two lugs 121, 122 and each lug is intended to engage in one compartment of the trunking 1 and to be pressed against the back 4a, 4b of the compartment.

Figure 4:
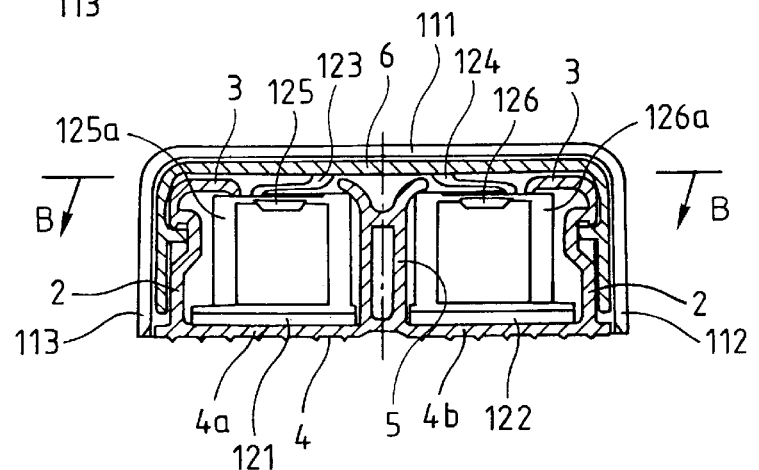
FIG. 4 is a view of the trunking shown in FIG. 1 in section taken along the line A—A.

An end region of each of the lugs 121, 122 has, on the same side as the closure part 110, a chimney 125, 126 which is substantially perpendicular to the lug, and more particularly perpendicular to the back 4a, 4b of the base section of the trunking, and whose height is advantageously substantially equal to the depth of the base section of the trunking (see FIG. 4 in particular).

Each chimney 125, 126 is formed by a cylindrical pipe and receives a nail for fixing each of the lugs to the wall supporting the trunking.

The nail passes through the base section of the trunking and is anchored in the wall supporting the trunking.

The upper end of each of the chimneys 125, 126 into which a nail is inserted is advantageously flush with the tops of the longitudinal lateral flanges 2 of the trunking 1.

Thus when nailing each of the lugs to the base section of the trunking, the chimney limits the stroke of the hammer, which prevents clumsy damage to a flange of the base section of the trunking.

This is particularly advantageous in the case of trunking with small dimensions, in which the space inside the trunking is relatively restricted and it is difficult to obtain access to the back of the base section for nailing a lug to the back of the base section.

In the example shown in FIGS. 2 to 5, each chimney 125, 126 is formed in a relatively massive part forming a kind of boss at the end of each of the fixing lugs 121, 122.

Also, each of the fixing lugs 121, 122 is joined to the closure part 110, more particularly to the closure wall 114, by a connecting part 123, 124.

Each chimney 125, 126 is situated at the junction between the connecting part 123, 124 and the lug 121, 122.

In the embodiment shown in FIGS. 2 to 5, each connecting part 123, 124 takes the form of a corrugated branch or tongue.

One end of the branch or tongue is connected to the closure wall 114 of the closure part 110 and the other end is connected to the outside surface 125a, 126a of the relatively massive part in which each chimney 125, 126 is formed.

The corrugations of each branch or tongue 123, 124 constituting a connecting part are formed on either side of a vertical plane extending along an axis X1 or X2 parallel to the longitudinal axis X of the end cap, which is also that of the trunking.

This kind of connecting part 123, 124 then constitutes an elastic coupling between the fixing part 120 and the closure part 110, enabling slight displacement of the closure part relative to the fixing part when the end cap is mounted on the end of the base section of the trunking.

This is particularly advantageous when, as shown in FIGS. 2 to 5, the closure part, the fixing part and the connecting part are molded in one piece from one or more plastics materials and the closure part includes a cover portion with upstanding rims, as previously described.

Accordingly, in this case, fitting the end cap to the base section of the trunking is relatively easy, even when access to the end of the base section of the trunking is difficult, which is the case when the end of the trunking is in a corner of a wall in particular.

When access to the end of the trunking is difficult, the fixing part of the end cap can be fitted to the back of the base section of the trunking in a direction substantially perpendicular to the axis X of the trunking.

When the location of the end of the trunking allows, the end cap can be threaded into the base section of the trunking along the axis X of the trunking.

The fixing part 120 of the end cap is nailed to the back of the base section of the trunking.

The closure part 110 of the end cap 100 is then moved in translation a short distance along the longitudinal axis of the trunking, toward the outside of the base section, so that the closure cover section of the trunking can easily be placed on it, with its cut end near the end of the trunking. The closure part is moved away from the fixing part of the end cap to facilitate fitting the closure cover section of the trunking to it.

Finally, when the closure part reverts elastically to its original position, the cover portion of the closure part covers the cut end of the closure cover section fitted to the base section of the trunking.

The elastic coupling between the fixing part 120 and the closure part 110 of the end cap 100 also allows, in addition to movement in translation of the closure part relative to the fixing part, slight tilting of the two parts relative to each other.

Figure 5:
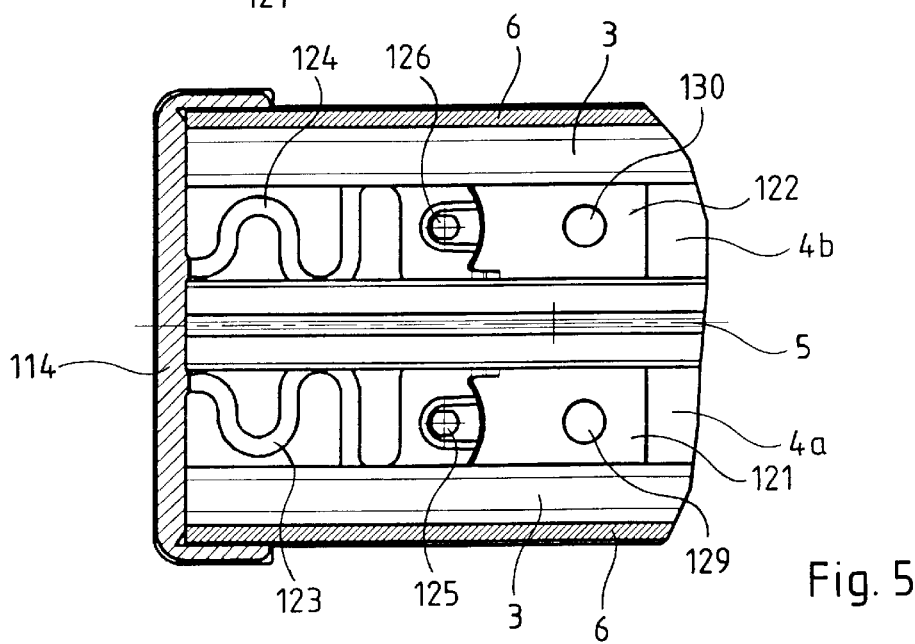
FIG. 5 is a view in section taken along the line B—B in FIG. 4.

As shown in FIGS. 4 and 5 in particular, when the end cap is fitted to the end of the base section of the trunking, the chimneys are perpendicular to the back of the base section and their upper ends are wedged under the rims 3 of the longitudinal lateral flanges 2 of the base section of the trunking.

The closure part closes the trunking transversely, with its cover portion covering an end part of the closure cover section of the trunking.

The end cap shown in FIGS. 2 to 5 can also be screwed to the base section of the trunking, of course, using two orifices 129, 130 provided at each of the free ends of the lugs 121, 122.

The facing inside longitudinal edges 127, 128 of each of the lugs 121, 122 include facing recesses 127a, 128a of part-circular shape and defining between them a housing for fastening the fixing part of the end cap to the base section of the trunking using a fixing member such as a plastics material wall plug.

This method of fixing can be envisaged only when the trunking has only one compartment, which is not the case with the trunking shown in the figures.

Different embodiments of the connecting parts 123, 124 constituting the elastic coupling between the fixing part 120 and the closure part 110 of the end cap 100 can be envisaged.

They include those shown in FIGS. 6 to 11.

Figure 6:
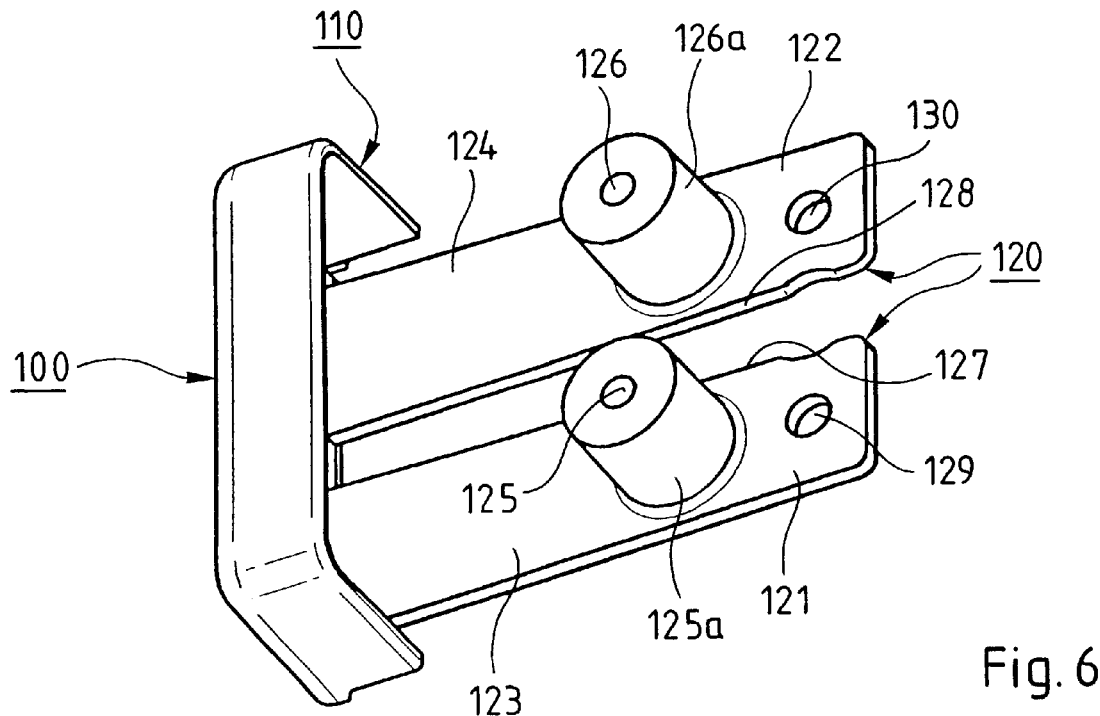
FIG. 6 is a perspective view of a second embodiment of an end cap according to the invention.

In FIG. 6, the connecting part 123, 124 of each lug 121, 122 connecting it to the closure part is an extension of the lug itself.

In this simplified embodiment, the outside wall of each chimney 125a, 126a is a circular cylindrical wall.

Figure 7:
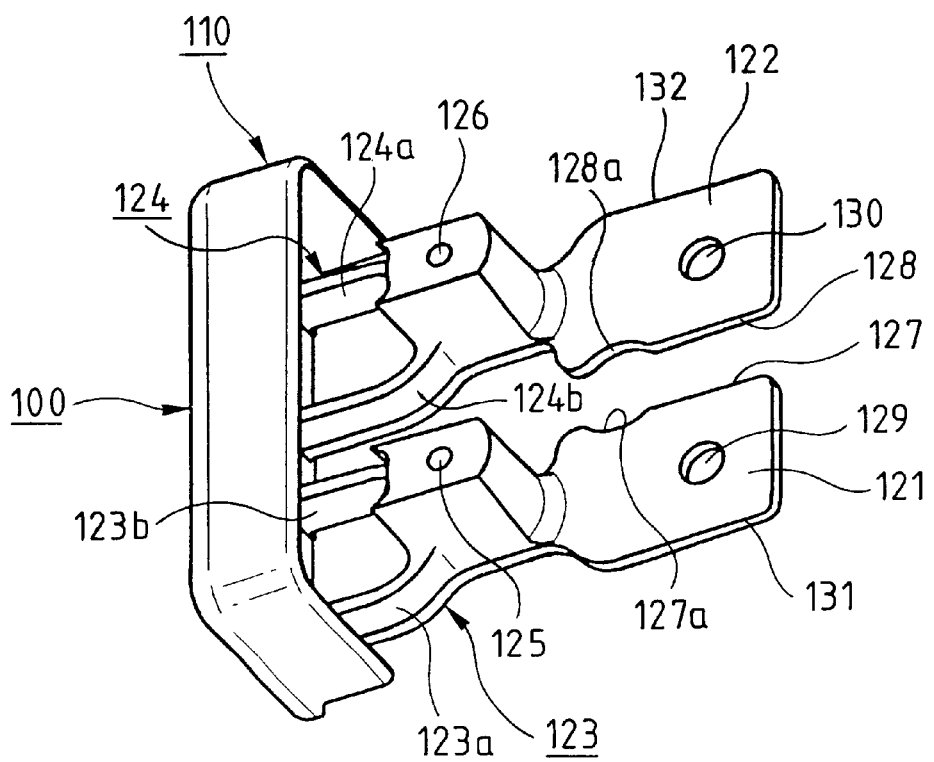
FIG. 7 is a perspective view of a third embodiment of an end cap according to the invention.

In the embodiment shown in FIG. 7 each connecting part 123, 124 of each lug 121, 122 connecting it to the closure part 110 has two branches 123a, 123b, 124a, 124b extending from one end of each lug 121, 122 (at which a chimney is situated) on either side of its longitudinal edges 127, 131, 128, 132, the branches 123a, 123b and 124a, 124b forming a kind of fork connecting the lug to the closure part 110.

In another embodiment shown in FIG. 8 in particular, the corrugated connecting part 123 of the fixing part 120 for fixing it to the closure part 110 has corrugations on each side of a longitudinal horizontal plane.

Each connecting part 123 can also consist of a tongue that extends in a generally oblique direction between the outside wall 125a of the chimney 125 and the closure part 110 as shown in FIG. 10.

In FIGS. 9 and 11 each connecting part 123 extends in the heightwise direction relative to each fixing lug 121 between an outside wall 125a of the chimney 125 and the closure part 110.

In FIG. 9 the connecting tongue 123 is at approximately the same height as the upper end of the chimney and in FIG. 11 the connecting tongue 123 extends approximately half the height between the fixing lug 121 and the upper part of the chimney 125.

To provide an elastic coupling between the fixing part 120 and the closure part 110 of the end cap according to the invention it is also possible to mold the connecting part in a plastics material that is flexible compared to the fixing part and for the closure part to be made from a rigid plastics material, so that the combination forms a two-material one-piece component.

Suitable plastics materials include flexible and rigid PVC.

FIG. 12 shows another embodiment of an end cap according to the invention in which the closure wall 114 and the cover portion 111, 112, 113 of the closure part consist of two separate parts joined together, with the closure wall 114 fastened to the fixing part 120 of the end cap 100 and forming one piece with it.

The cover portion 111 also has upstanding rims 112, 113 and a plane upper part adapted to receive a closure cover section cut end.

In this embodiment, the junction between the closure wall 114 and the fixing lugs 121 is a massive connecting part with an inside surface flush with the bottom surface of the lugs 121, 122. Its top surface is substantially flush with the top end of the chimneys 125, 126.

Figure 2:
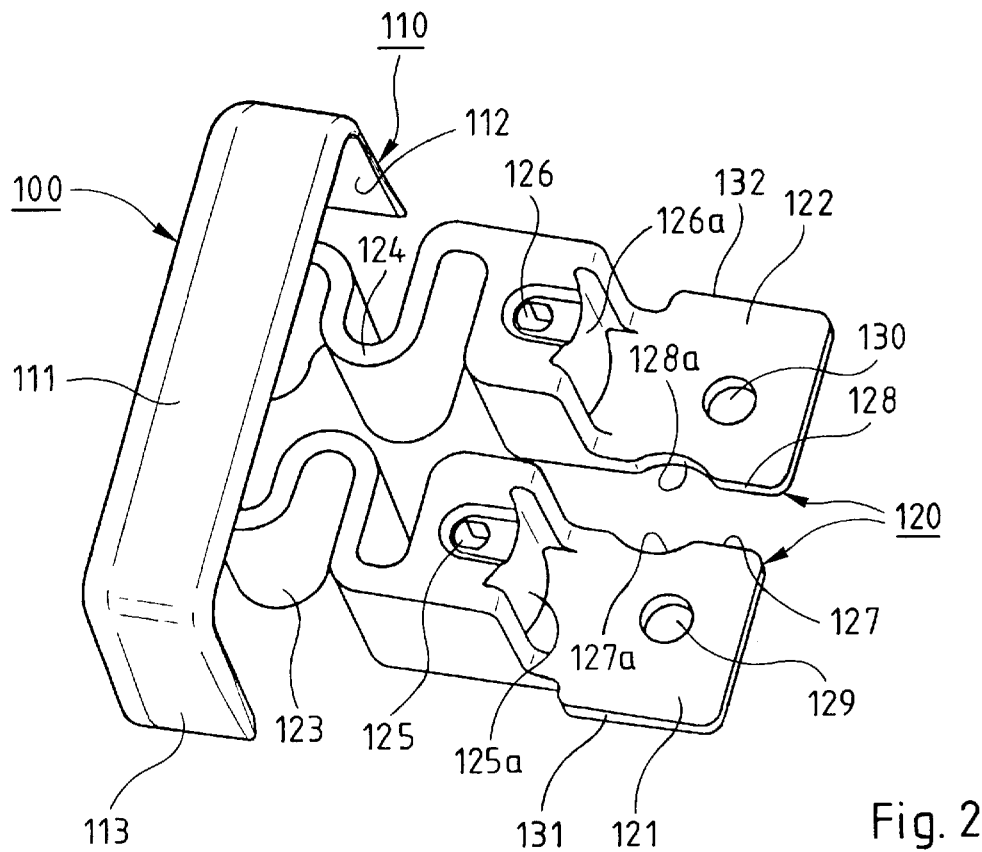
FIG. 2 is a top perspective view of a preferred embodiment of the end cap according to the invention.
Figure 3:
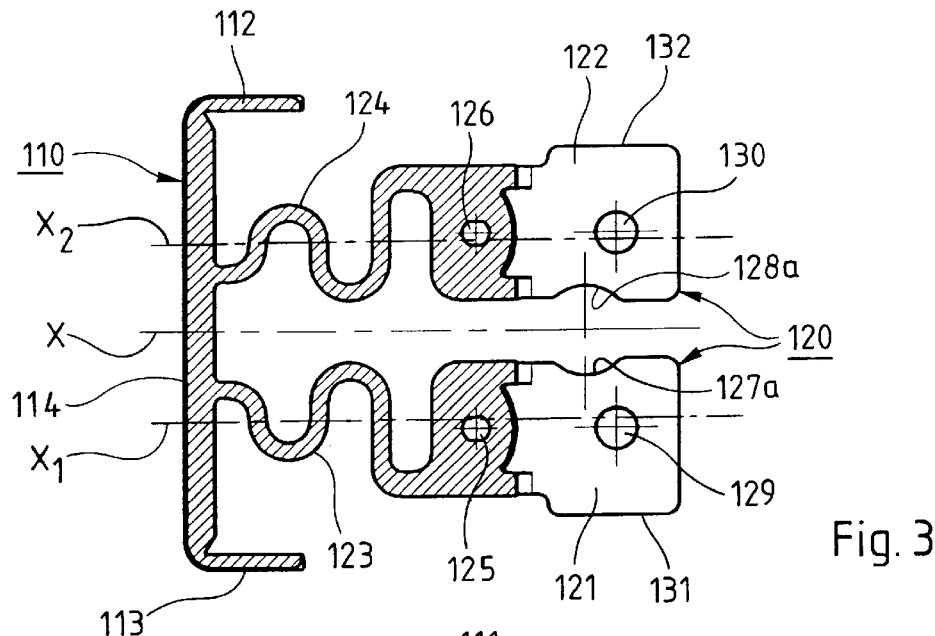
FIG. 3 is a view in section in a horizontal longitudinal plane halfway up the height of the end cap shown in FIG. 2.

Oblong openings 123a, 123b formed in the upper part of the massive connecting part between the closure wall 114 and the fixing part 120 are adapted to receive retaining pins of the cover portion 111 of the closure part 110, as shown in dashed outline in FIG. 2, which shows the cover portion 111 of the closure part 110.

The present invention is in no way limited to the embodiments described and shown, many variants of which conforming to the spirit of the invention will be evident to the skilled person.

In particular, a variant that is not shown comprises an end cap of the same type as that shown in FIG. 2 but having only one fixing lug (similar to one of the fixing lugs of the end cap shown in FIG. 2, for example), supporting a chimney and connected to the closure part by a corrugated connecting part forming an elastic coupling between the closure and fixing parts.

In another variant that is not shown an end cap of the same type as that shown in FIG. 2 includes a single fixing lug (similar to one of the fixing lugs of the end cap shown in FIG. 2) twice the width of the fixing lug of the end cap shown in FIG. 2 and supporting two identical parallel chimneys, the double-width fixing lug being connected to the closure part by two corrugated connecting parts forming elastic couplings and extending in parallel between the chimneys and the closure part, each of the connecting parts issuing from the outside wall of a chimney.

What is claimed is:

1. An end cap for closing an end of trunking, said end cap including a closure part for closing an interior space of said trunking and a fixing part for fixing it to a back of a base section of said trunking, wherein said fixing part includes at least one chimney for inserting a nail, which chimney is substantially perpendicular to said back of said base section and has a height substantially equal to the depth of said base section.

2. The end cap claimed in claim 1 wherein said fixing part includes a lug adapted to be applied to said back of said base section of said trunking and from which said at least one chimney protects.

3. The end cap claimed in claim 1 wherein said fixing part includes two substantially parallel lugs adapted to be applied to said back of said base section of said trunking said at least one chimney comprising two chimneys, each projecting from one of said lugs.

4. The end cap claimed in claim 3 wherein said lugs have, on facing inside longitudinal edges, facing recesses of complementary shape forming a housing for fastening said fixing part to said base section of said trunking by means of a fixing member.

5. The end cap claimed in claim 4 wherein said recesses are part-circular.

6. The end cap claimed in claim 3 wherein each lug is connected to said closure part by a connecting part.

7. The end cap claimed in claim 6 wherein each chimney is at the junction of each lug and each connecting part.

8. The end cap claimed in claim 6 wherein each connecting part is an extension of said lug itself.

9. The end cap claimed in claim 6 wherein each connecting part has two branches extending from one end of each lug on each side of its longitudinal edges and said branches form a kind of fork connecting said lug to said closure part.

10. The end cap claimed in claim 6 wherein each connecting part is a tongue extending generally obliquely between each lug and said closure part.

11. The end cap claimed in claim 6 wherein each connecting part is a tongue which extends in the heightwise direction relative to each lug between an outside wall of each chimney and said closure part.

12. The end cap claimed in claim 11 wherein each connecting part extends in a plane parallel to that of each lug and substantially at the height of an upper end of each chimney.

13. The end cap claimed in claim 6 wherein each connecting part is a massive part which has a bottom surface flush with a bottom surface of each lug and a top surface substantially flush with a top end of each chimney.

14. The end cap claimed in claim 6 wherein, each connecting part is an elastic part allowing slight movement of said closure part relative to said fixing part when fitting said end cap to said base section of said trunking.

15. The end cap claimed in claim 14 wherein said elastic part connecting each lug to said closure part has a corrugated shape forming a spring.

16. The end cap claimed in claim 3 wherein each lug of said fixing part has at its free end an orifice through which a fixing screw can pass into said base section of said trunking.

17. The end cap claimed in claim 1 wherein said closure part has a closure wall and a cover portion adapted to cover an end of a closure cover section of said trunking.

18. The end cap claimed in claim 17 wherein said closure wall and said cover portion of said closure part are molded in one piece from one or more plastics materials.

19. The end cap claimed in claim 17 wherein said closure wall and said cover portion of said closure part are two separate components fastened together and said closure wall is fastened to said fixing part of said end cap.

20. The end cap claimed in claim 17 wherein said fixing part and said closure part of said end cap are molded in one piece from one or more plastics materials.

* * * * *